(12) United States Patent
Chang et al.

(10) Patent No.: US 10,481,288 B2
(45) Date of Patent: Nov. 19, 2019

(54) ULTRASONIC TRANSDUCER WITH IMPROVED BACKING ELEMENT

(71) Applicant: Halliburton Energy Services, Inc., Houston, TX (US)

(72) Inventors: Chung Chang, Houston, TX (US); Jing Jin, Singapore (SG); Yao Ge, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 349 days.

(21) Appl. No.: 15/511,936

(22) PCT Filed: Oct. 2, 2015

(86) PCT No.: PCT/US2015/053680
§ 371 (c)(1),
(2) Date: Mar. 16, 2017

(87) PCT Pub. No.: WO2017/058244
PCT Pub. Date: Apr. 6, 2017

(65) Prior Publication Data
US 2017/0299751 A1    Oct. 19, 2017

(51) Int. Cl.
*G01V 1/44* (2006.01)
*B06B 1/06* (2006.01)
(Continued)

(52) U.S. Cl.
CPC .............. *G01V 1/44* (2013.01); *B06B 1/0644* (2013.01); *E21B 47/0005* (2013.01);
(Continued)

(58) Field of Classification Search
CPC ........ G01V 1/52; G01V 1/523; B06B 1/0685; E21B 47/0005
See application file for complete search history.

(56) References Cited

U.S. PATENT DOCUMENTS 2,972,068 A * 2/1961 Howry ................ G10K 11/002
310/327
3,150,347 A * 9/1964 Hanish ..................... G01S 1/72
310/337
(Continued)

FOREIGN PATENT DOCUMENTS

CN          2865867 Y      2/2007
KR       20060021026 A      3/2006
KR         101195671 B1    10/2012

OTHER PUBLICATIONS

International Preliminary Report on Patentability issued in related PCT application PCT/US2015/053680, dated Apr. 12, 2018, 11 pages.

(Continued)

*Primary Examiner* — John Fitzgerald
(74) *Attorney, Agent, or Firm* — Ben Fite; Baker Botts L.L.P.

(57) ABSTRACT

In accordance with embodiments of the present disclosure, systems and methods for improving performance of ultrasonic transducers, particularly those used in borehole environments, are provided. The disclosed ultrasonic transducers all feature a backing element that is a ceramic backing material. The ceramic backing material may include a solid piece of ceramic material that is disposed on a back end of a piezoelectric element used in the ultrasonic transducer. The disclosed ceramic backing material may be used to mechanically match the backing element to the piezoelectric source element, while minimizing the amplitude of reflections of the ultrasonic pulse generated by the piezoelectric element and reflected at the far end of the backing element. This ceramic backing material may provide consistent performance regardless of the surrounding pressure and temperature, making it particularly useful in borehole applications.

17 Claims, 5 Drawing Sheets

(51) Int. Cl.
  *G01V 1/52* (2006.01)
  *E21B 47/00* (2012.01)
  *E21B 47/09* (2012.01)
  *E21B 49/00* (2006.01)

(52) U.S. Cl.
  CPC ........ *E21B 47/0006* (2013.01); *E21B 47/091* (2013.01); *E21B 49/00* (2013.01); *G01V 1/52* (2013.01)

(56) References Cited

U.S. PATENT DOCUMENTS

| | | | | |
|---|---|---|---|---|
| 3,663,842 | A * | 5/1972 | Miller | B06B 1/067 |
| | | | | 252/62 |
| 4,255,798 | A * | 3/1981 | Havira | E21B 47/0005 |
| | | | | 181/105 |
| 4,382,201 | A * | 5/1983 | Trzaskos | G10K 11/165 |
| | | | | 264/102 |
| 4,779,244 | A * | 10/1988 | Horner | B06B 1/0685 |
| | | | | 181/151 |
| 4,800,316 | A | 1/1989 | Ju-Zhen | |
| 5,146,050 | A * | 9/1992 | Strozeski | G01V 1/52 |
| | | | | 181/102 |
| 5,195,373 | A | 3/1993 | Light et al. | |
| 5,311,095 | A | 5/1994 | Smith et al. | |
| 5,354,956 | A * | 10/1994 | Orban | B06B 1/0681 |
| | | | | 175/40 |
| 5,389,848 | A * | 2/1995 | Trzaskos | B06B 1/0611 |
| | | | | 310/322 |
| 5,469,736 | A * | 11/1995 | Moake | G01B 17/00 |
| | | | | 73/152.58 |
| 5,644,186 | A * | 7/1997 | Birchak | G10K 11/004 |
| | | | | 310/337 |
| 5,648,941 | A | 7/1997 | King | |
| 5,744,898 | A * | 4/1998 | Smith | B06B 1/064 |
| | | | | 310/334 |
| 6,466,513 | B1 | 10/2002 | Pabon et al. | |
| 6,483,225 | B1 | 11/2002 | Spigelmyer | |
| 6,761,692 | B2 | 7/2004 | Angelsen et al. | |
| 6,822,376 | B2 | 11/2004 | Baumgartner | |
| 7,053,530 | B2 | 5/2006 | Baumgartner et al. | |
| 7,285,897 | B2 | 10/2007 | Fisher et al. | |
| 8,354,773 | B2 | 1/2013 | Oliver et al. | |
| 9,050,628 | B2 * | 6/2015 | Lautzenhiser | E21B 47/101 |
| 9,079,221 | B2 * | 7/2015 | Goodman | B06B 1/0625 |
| 9,105,836 | B2 * | 8/2015 | Matam | H01L 41/083 |
| 9,142,752 | B2 * | 9/2015 | Lautzenhiser | H01L 41/04 |
| 9,363,605 | B2 * | 6/2016 | Goodman | H04R 31/00 |
| 9,567,846 | B2 * | 2/2017 | Leggett, III | E21B 47/01 |
| 9,597,709 | B2 * | 3/2017 | Khajeh | B06B 1/0622 |
| 9,976,406 | B2 * | 5/2018 | Lautzenhiser | H01L 41/083 |
| 2005/0002276 | A1 * | 1/2005 | Yogeswaren | G01V 1/186 |
| | | | | 367/152 |
| 2005/0075571 | A1 | 4/2005 | Barnes | |
| 2005/0150655 | A1 * | 7/2005 | Duong | E21B 47/01 |
| | | | | 166/249 |
| 2005/0259512 | A1 * | 11/2005 | Mandal | E21B 47/082 |
| | | | | 367/10 |
| 2007/0057777 | A1 * | 3/2007 | Burnett | G08B 3/10 |
| | | | | 340/384.4 |
| 2009/0049918 | A1 | 2/2009 | Luo et al. | |
| 2009/0213690 | A1 | 8/2009 | Steinsiek et al. | |
| 2012/0238880 | A1 | 9/2012 | Davidsen | |
| 2013/0147316 | A1 * | 6/2013 | Matam | H01L 41/083 |
| | | | | 310/327 |
| 2013/0342077 | A1 | 12/2013 | Lautzenhiser et al. | |
| 2014/0050054 | A1 | 2/2014 | Toda et al. | |
| 2015/0061465 | A1 * | 3/2015 | Lee | B06B 1/06 |
| | | | | 310/334 |
| 2015/0322768 | A1 * | 11/2015 | Lautzenhiser | H01L 41/083 |
| | | | | 73/152.02 |
| 2016/0296975 | A1 * | 10/2016 | Lukacs | A61B 8/12 |

OTHER PUBLICATIONS

Maréchal, P., et al. "Modeling of a high frequency ultrasonic transducer using periodic structures." Ultrasonics 48.2 (2008): 141-149.

International Search Report and Written Opinion issued in related PCT Application No. PCT/US2015/053680 dated Jun. 29, 2016, 14 pages.

TOKIN Company, "Piezoelectric Ceramics", vol. 5, Apr. 14, 2017, 39 pages.

* cited by examiner

ULTRASONIC TRANSDUCER WITH IMPROVED BACKING ELEMENT

CROSS-REFERENCE TO RELATED APPLICATION

The present application is a U.S. National Stage Application of International Application No. PCT/US2015/053680 filed Oct. 2, 2015, which is incorporated herein by reference in its entirety for all purposes.

TECHNICAL FIELD

The present disclosure relates generally to ultrasonic transducers and, more particularly, to an ultrasonic transducer with an improved backing material for attenuating acoustic waves.

BACKGROUND

Ultrasonic transducers are used in a wide variety of contexts including, but not limited to, oil and gas applications, non-destructive testing, and the medical field. Ultrasonic transducers generally operate by outputting an ultrasonic pulse or vibration in a direction of an object or area to be sensed, and detecting echoes of the original ultrasonic pulse reflected off the object or another point in the sensor range. To accomplish this, ultrasonic transducers typically include a piezoelectric element, positioned between two electrodes, designed to generate the ultrasonic pulse when a voltage is applied across the electrodes. The piezoelectric element may also move in response to the ultrasonic echoes reaching the transducer, and this movement can generate a current across the electrodes that is used to determine a distance from the transducer to the sensed object. In order to generate a clean ultrasonic pulse, such ultrasonic transducers typically include a backing material positioned near the piezoelectric element to reduce reverberations inside the transducer.

In traditional borehole operations, ultrasonic transducers are often equipped with a backing material made of tungsten-rubber to dampen internal reverberations generated by the piezoelectric element of the transducer. Unfortunately, there are certain disadvantages associated with the use of tungsten rubber backing materials in transducers, and particularly those transducers used in borehole operations. For example, it can be difficult to produce a consistent and sizable homogeneous tungsten-rubber mixture for the backing material, which makes such mixtures expensive and laborious to produce. In addition, it can be challenging to optimize the properties of the backing material so that the backing material matches a mechanical impedance of the piezoelectric element and operates with a desired attenuation coefficient. These two properties often compete with each other in existing ultrasonic transducers. Further, the mechanical properties of the rubber in the tungsten-rubber mixture can change dramatically as borehole temperature rises, which can lead to a poor coupling between the piezoelectric element and the tungsten-rubber backing material. Still further, as temperature rises in borehole applications, the effects on the tungsten-rubber mixture can reduce the capability of dampening the reverberations from the piezoelectric element via the backing material. There can also be significant changes in the attenuation coefficient of the backing material as the rubber matrix gets softer at higher temperatures.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
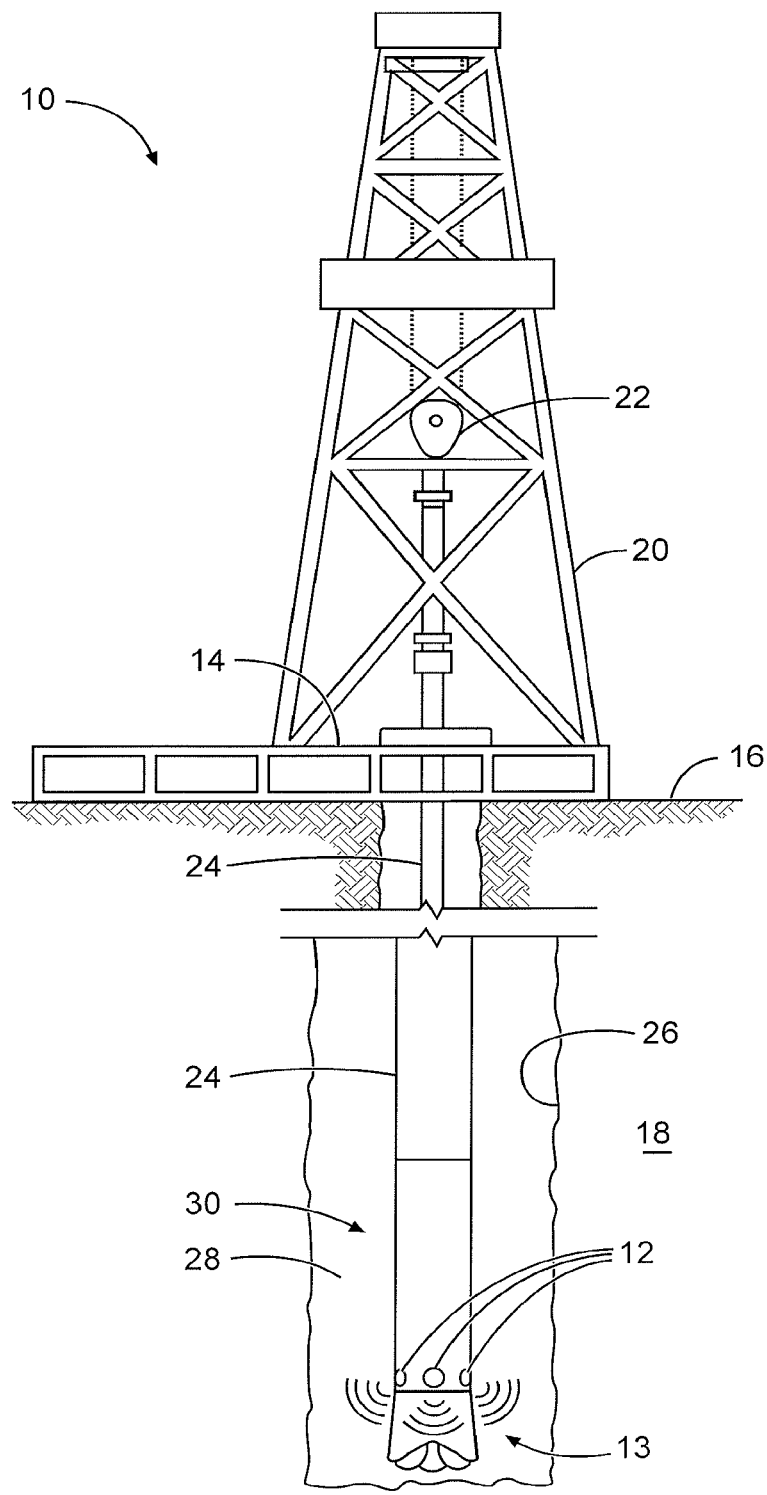
FIG. 1 is a schematic illustration of a drilling system equipped with ultrasonic transducers and being used to drill a wellbore, in accordance with an embodiment of the present disclosure.

Illustrative embodiments of the present disclosure are described in detail herein. In the interest of clarity, not all features of an actual implementation are described in this specification. It will, of course, be appreciated that in the development of any such actual embodiment, numerous implementation-specific decisions must be made to achieve developers' specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for improving performance of ultrasonic transducers, particularly those used in borehole environments. The disclosed ultrasonic transducers feature a backing element that is made from a ceramic material. The ceramic backing element may include a solid piece of ceramic material that is disposed on a back end of a piezoelectric element used in the ultrasonic transducer.

Ultrasonic transducers are used in a wide variety of contexts, including downhole applications, medical applications, and non-destructive testing. Transducers used in the medical field often feature a backing element made from metal, epoxy, or a composite material. Transducers used in non-destructive testing and borehole applications, however, often have to operate in more stressful environments. Thus, the ultrasonic transducers used in these environments typically feature a backing element made from a tungsten-rubber composite.

Although this tungsten-rubber epoxy exhibits fairly good ultrasonic wave attenuation at ambient conditions, the material generally does not perform as well at the relatively high temperatures and pressures experienced downhole. The rubber, which can make up approximately 3% of the tungsten-rubber mixture, is sensitive to high temperatures and pressures and can become debonded from certain parts of the transducer at these high temperature and pressure conditions. In addition, the changing properties of the rubber at high temperatures and pressures can reduce the dampening capability of the backing material and affect the attenuation coefficient of the backing material.

In addition, the tungsten-rubber backing material can be relatively difficult to manufacture. Specifically, it is desirable to achieve a uniform mixture of the tungsten and rubber elements, in order to form a tungsten-rubber backing material with uniform or nearly uniform impedance across the backing. Unfortunately, the tungsten and rubber portions can be difficult to mix to form this even distribution of tungsten and rubber. Further, the tungsten-rubber material must also be vulcanized, or baked, to achieve a stable form for use in dowhole applications. This vulcanization represents an additional step in the process of forming the tungsten-rubber backing, therefore complicating the manufacturing process.

To address these drawbacks, the presently disclosed embodiments are directed to an entirely ceramic backing material being used to form the backing element of ultrasonic transducers for use in downhole applications. These ceramic backing elements may also be used in transducers designed for medical and non-destructive testing applications. The disclosed ceramic backing material may be used to mechanically match (i.e., mechanical impedance) the backing element to the piezoelectric source element, while minimizing the amplitude of reflections of the ultrasonic pulse generated by the piezoelectric element and reflected at the far end of the backing element. This ceramic backing element may provide consistent performance regardless of the surrounding pressure and temperature, making it particularly useful in borehole applications.

The disclosed ceramic backing material may provide better impedance matching to the active piezoelectric element than would be possible using the existing tungsten-rubber backing. In addition, the disclosed ceramic backing will not degrade at higher temperatures like the tungsten-rubber mixture. Further, the ceramic backing material may be machinable and thermally compatible with the piezoelectric element. Still further, the ceramic backing material may provide a desired attenuation of the ultrasonic wave outputs based not only on the material itself but on the particular surface geometry of the backing (which may be machined for increased attenuation).

Turning now to the drawings, FIG. 1 is a diagram of an example drilling system 10 incorporating a plurality of ultrasonic transducers 12 disposed on a drill bit 13, according to aspects of the present disclosure. The drilling system 10 may include a drilling platform 14 positioned at a surface 16. In the embodiment shown, the surface 16 includes the top of a formation 18, and the drilling platform 14 may be in contact with the surface 16. In other embodiments, such as in an off-shore drilling operation, the surface 16 may be separated from the drilling platform 14 by a volume of water. A derrick 20 may be supported by the drilling platform 14 and have a traveling block 22 for raising and lowering a drill string 24 through a borehole 26 created by the drill bit 13. When the drilling system 10 is in use, the drill bit 13 may rotate and extend the borehole 26 through a portion of the formation 18 in front of the drill bit 13.

The drill bit 13 may be coupled to the drill string 24 and driven by a downhole motor and/or rotation of the drill string 24 by a rotary table and kelly, or by a top drive. A pump may circulate drilling fluid through a feed pipe to the kelly or top drive, downhole through the interior of drill string 24, through orifices in the drill bit 13, back to the surface via an annulus 28 around the drill string 24, and into a retention pit. The drilling fluid transports cuttings from the borehole 26 into the pit and aids in maintaining integrity of the borehole 26.

The drilling system 10 may further include a bottom hole assembly (BHA) 30 coupled to the drill string 24 near the drill bit 13. The BHA 30 may include various downhole measurement tools and sensors, such as logging while drilling (LWD) or measurement while drilling (MWD) tools, one or more telemetry systems, and/or a downhole motor, among other components.

In presently disclosed embodiments, the drill string 24 or BHA 30 may include one or more ultrasonic transducers 12 disposed thereon. As illustrated, the BHA 30 may include a plurality of ultrasonic transducers 12 disposed around an outer circumference of the drill string 24 to detect one or more desired measurements. For example, the ultrasonic transducers 12 may be designed to measure a distance between the cutters on the drill bit 13 and a wall of the borehole 26. To that end, the ultrasonic transducers 12 may be configured and positioned to output an ultrasonic pulse toward a portion of the borehole 26, and to detect echoes of the ultrasonic pulse that are received back at the transducers 12. A control system communicatively coupled to the transducers 12 may determine a distance from the cutters to the borehole wall based on the electrical response from the transducers 12. As described in detail below, one or more of the ultrasonic transducers 12 disposed on the drill string 24 may utilize a backing element constructed from a ceramic material to effectively attenuate internal acoustic waves produced by the transducers 12 while being used in the borehole 26.

Figure 2:
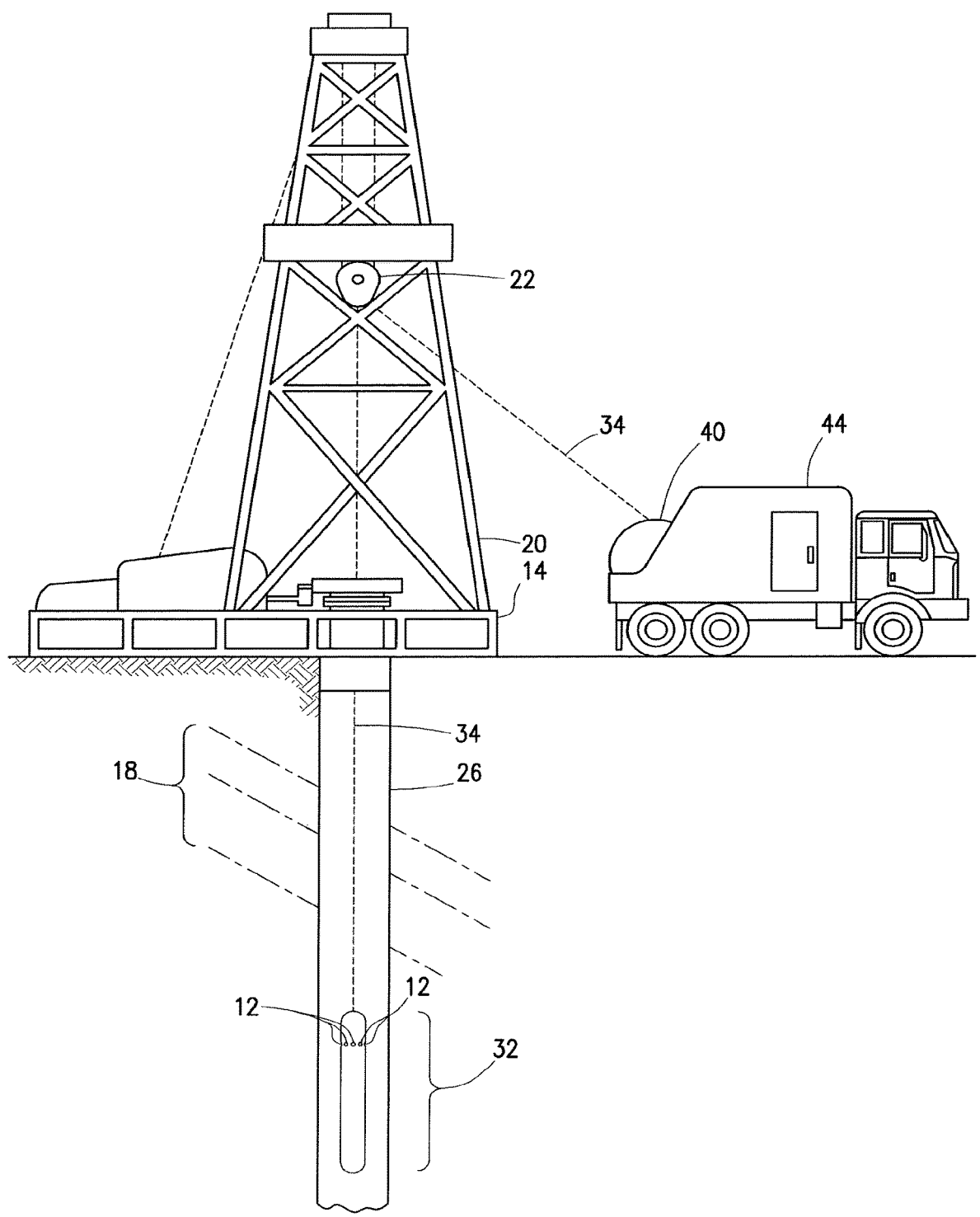
FIG. 2 is a schematic partial cross-sectional view of a conveying member with ultrasonic transducers being deployed in a wellbore environment, in accordance with an embodiment of the present disclosure.

FIG. 2 illustrates oil well equipment being used in a borehole environment after the borehole 26 is drilled to a desired depth through various formations 18. As discussed above, the drilling platform 14 supports the derrick 20 having a traveling block 22 for raising and lowering the drill string (not shown). The drill string creates the borehole 26 that passes through the formations 18. At various times during the drilling process, the drill string may be removed from the borehole 26.

Once the drill string has been removed, a subsurface device 32 including one or more logging tools may be lowered downhole to a desired depth via a conveying member 34 to perform logging operations on the wellbore at the desired depth. Such logging tools may include, among other sensors, the disclosed ultrasonic transducers 12 having a ceramic backing material. The logging tools may include other sensors for logging downhole parameters such as, for example, temperature, pressure, magnetic field, electromagnetic energy, radioactivity, resistivity, shock, vibrations, torque, and telemetry signals, among others. The logging tools may be lowered on the conveying member 34, as illustrated, or may be lowered along a tool string selectively positioned downhole.

In some embodiments, the conveying member 34 may be or include a slickline, a wireline, coiled tubing, a downhole tractor, or any other conveyance system designed to lower the subsurface device 32 through the borehole 26 or a tubular string such as a casing. In some embodiments, the conveying member 34 may include one or more cables running the length of the conveying member 34 and secured within a polymer material surrounded by a protective coating sheath. The conveying member 34 may be unspooled from a spool 40 on a truck 44 onto a sheave (e.g., traveling block 22 or some other sheave) on the drilling platform 14.

From here, the conveying member 34 with the subsurface device 32 may be lowered (deployed) into the borehole 26 and subsequently raised (retracted) from the borehole 26 after performing logging operations using the ultrasonic transducers 12.

As mentioned above, the subsurface device 32 may be lowered into the borehole 26 by the conveying member 34. The subsurface device 32 may include one or more ultrasonic transducers 12 disposed thereon for measuring various properties downhole. For example, in some embodiments, the ultrasonic transducers 12 may be used to detect and ultimately map out the internal shape of the borehole 26. In addition, the measurements obtained via the ultrasonic transducers may be used to evaluate the formations 18 that the subsurface device passes as the device is lowered through the borehole 26. In some embodiments, the borehole 26 may be lined with casing that is secured to the borehole 26 via a cementing process. In such instances, the ultrasonic transducers 12 may be lowered through the borehole 26 on the conveying member 34 to determine a quality of the cement boding between the casing and the borehole wall. In other embodiments, the ultrasonic transducers 12 may be lowered through the cased borehole 26 to perform measurements that may be used to detect corrosion of the casing.

In some embodiments, the transducers 12 may each be angled perpendicularly to the borehole 26 to output and capture echoed pulses via the same transducer 12. However, in other embodiments, the transducers 12 may be angled relative to each other and the borehole 26 in a manner that enables the transducers 12 to perform pitch-catch measurements. That is, one transducer 12 may be pointed at an angle toward the borehole 26 such that the reflection of the ultrasonic pulse off the borehole 26 is picked up by another transducer 12 located on the subsurface device 32.

Again, these ultrasonic transducers 12 may feature an improved backing element constructed from a ceramic material. Such transducers 12 may be particularly useful in borehole conditions, such as those illustrated in and described with reference to FIGS. 1 and 2. The ultrasonic transducers 12 may be utilized during drilling (FIG. 1), or after drilling (FIG. 2) during subsequent borehole evaluation processes. The presently disclosed ultrasonic transducers 12 equipped with ceramic backing material may be particularly useful when performing measurements in deeper boreholes 26, since the ceramic material is able to maintain desired attenuation and mechanical properties at the higher temperatures and pressures experienced in deep borehole environments. For example, the ceramic material may maintain its desired operating properties in environments with temperatures up to approximately 320° Celsius and/or with pressures up to approximately 35,000 psi.

Figure 3:
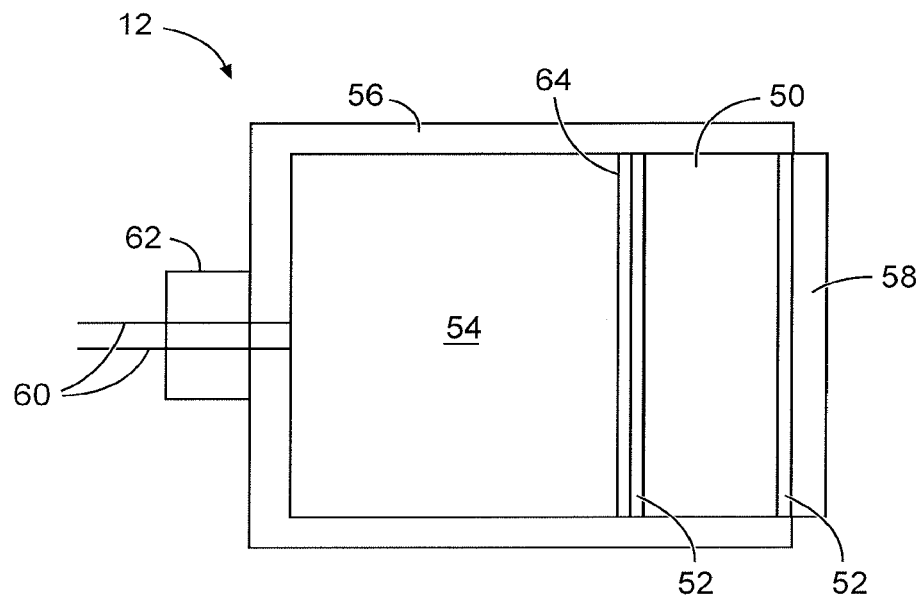
FIG. 3 is a schematic illustration of an ultrasonic transducer with a ceramic backing material, in accordance with an embodiment of the present disclosure.

FIG. 3 is a block diagram illustrating one embodiment of the disclosed ultrasonic transducer 12 that may be used in borehole environments, as well as other types of environments. The ultrasonic transducer 12 generally includes a piezoelectric element 50 with two electrodes 52, one disposed on each face of the piezoelectric element 50, and a backing element 54. These components are generally disposed within a protective housing 56. A matching layer 58 may be disposed adjacent the piezoelectric element 50 in a direction opposite from the direction of the backing element 54. In other embodiments, various other components may be used in conjunction with, or in lieu of, the elements shown in the illustrated ultrasonic transducer 12.

In general, the piezoelectric element 50 may include one or a stack of materials that have piezoelectric properties, meaning that the materials will move (e.g., expand and contract) when a current is applied across the material. Thus, the piezoelectric element 50 may act as a source element of the ultrasonic transducer 12 by vibrating and outputting ultrasonic pulses in response to receiving a current applied across the piezoelectric element 50 via the electrodes 52 on the sides of the element. Conversely, the piezoelectric element 50 may act as a receiver element of the ultrasonic transducer 12 by generating a current between the electrodes 52 in response to echoes of an ultrasonic pulse arriving at the piezoelectric element 50 and thereby causing the element 50 to move.

In some embodiments, the same piezoelectric element 50 may function both as the source and the receiver for a given ultrasonic transducer 12. In other embodiments, such as those used to perform pitch-catch measurements, the piezoelectric element 50 of one ultrasonic transducer 12 may function as the source, while the piezoelectric element 50 of another ultrasonic transducer 12 may function as the receiver that "catches" the echoed ultrasonic pulse output from the source transducer 12. In some embodiments, the ultrasonic transducer 12 may be a diced transducer having slices or cuts taken through at least the piezoelectric element.

Although not shown, each of the electrodes 52 may be coupled to one of a pair of leads 60 that are generally routed away from the ultrasonic transducer 12 through a connector 62 at the back of the housing 56. These leads 60 and the connector 62 may be used to communicatively couple the ultrasonic transducer 12 to a control component disposed in the downhole tool (e.g., wireline device, slickline device, drill string, or work string) or other component within which the transducer is incorporated. The matching material 58 may be disposed between the piezoelectric material 50 and the outside environment and used to match the impedance of the piezoelectric material to an impedance of the fluid (e.g., borehole fluid) in the outside environment. In other embodiments, the ultrasonic transducer 12 may not include a matching layer 58, but may instead include a wear plate, end cap, window, and/or other components on the front end of the transducer.

The backing element 54 of the ultrasonic transducer 12 is generally positioned on the back side of the piezoelectric element 50 to attenuate any ultrasonic acoustic waves that are released from the piezoelectric element 50 in a direction toward the back of the transducer 12. That is, the backing element 54 may act as a dampening material to ensure that any ultrasonic pulses pushed toward the back of the transducer 12 do not interfere with the sensing being done at the piezoelectric element 50. Thus, the reflected acoustic waves from the back side of the transducer cannot reach the piezoelectric element 50 to interfere with the echoed pulses being detected from the front side of the transducer 12.

In present embodiments, the backing element 54 may include an entirely ceramic backing material. That is, the ceramic backing element 54 may not feature any metal or elastomeric elements. The ceramic material used for the backing element 54 may have a relatively high stiffness and appropriate thermal stability for use in downhole applications. Although relatively high stiffness materials generally offer less attenuation to acoustic vibrations, the ceramic material may be selected to provide an adequate sound attenuation coefficient. It may be desirable for the ceramic backing material to be mechanically compatible (i.e., impedance matching) with the piezoelectric element 50. Since ceramic materials, such as lead zirconate titanate (PZT), are often used for at least part of the piezoelectric element 50, the ceramic used for the backing element 54 may be relatively easy to mechanically match with the piezoelectric element 50. The acoustic impedance to be matched between the materials is related to both the density of the medium (i.e., ceramic backing material and ceramic piezoelectric element) and the velocity or speed of sound through the medium.

In addition to the above considerations, the ceramic material used for the ceramic backing element 54 may be chosen to have a sufficiently low mechanical Q factor. The Q factor refers to a dimensionless parameter representing how under-damped a resonator is, among other things. Thus, it is desirable for the ceramic material to have a relatively low Q factor so that the backing element 54 exhibits a desired amount of damping of acoustic waves from the piezoelectric element 50. In some embodiments, it may be desirable for the ceramic backing material to have a Q factor of less than approximately 10. In other embodiments, the ceramic material may be chosen to have a mechanical Q factor of less than approximately 20.

The disclosed ceramic material that makes up the backing element 54 may be more temperature stable at high borehole temperatures than the materials used in existing transducers. As discussed above, currently used backing materials are often mixtures (e.g., tungsten-rubber) including some amount of elastomer, which can degrade at relatively high temperatures and pressures such as those experienced in borehole environments. Unlike these elastomeric materials, the presently disclosed ceramic backing element 54 may maintain stability and a high level of acoustic attenuation performance at the relatively high downhole temperatures and pressures.

In addition, the disclosed ceramic backing element 54 may be less expensive to manufacture than currently used tungsten-rubber backing elements, since the ceramic backing material is a structural material that does not have to be mixed from various constituent parts or vulcanized prior to assembly of the transducer 12. In some embodiments, the ceramic backing element 54 (already a relatively large ceramic structure within the ultrasonic transducer 12) may be shaped, machined, or otherwise constructed to form or include the housing portion 56 of the ultrasonic transducer 12. This may further simplify construction of the transducer 12, since fewer parts are needed to be fit together once the backing element 54/housing 56 is shaped.

As illustrated, the ultrasonic transducer 12 may also include a bonding layer 64 disposed between the piezoelectric element 50 (and corresponding electrodes 52) and the backing element 54. The bonding layer 64 is generally used to mechanically couple the piezoelectric element 50 to the backing element 54. This bonding layer 64 may be formed from a variety of available bonding materials to minimize the effect or amplitude of acoustic waves moving between the piezoelectric element 50 and the backing element 54. In existing transducers, only select bonding materials could be used to couple the ceramic piezoelectric element to the tungsten-rubber backing element, due to the differences in the material types, coefficients of thermal expansion of the piezoelectric and backing elements, and other factors. The presently disclosed ceramic backing element 54 may enable the use of a wider variety of bonding materials that are compatible to form the bonding layer 64 between the piezoelectric element 50 and the ceramic backing element 54.

In some embodiments, the bonding layer 64 may be formed from a material that is mainly epoxy with a relatively small amount of metal or ceramic powder mixed therein. The metal or ceramic powder mixed into the epoxy may help to more closely match the impedance of the bonding layer 64 with the impedance of the piezoelectric element 50 and the ceramic backing element 54. The bonding material may be layered thinly between the piezoelectric element 50 and the backing element 54, in order to minimize interference between the two elements.

In addition, the coefficient of thermal expansion (CTE) of the ceramic backing element 54 may be relatively close to the CTE of the piezoelectric element 50, due to them both being formed primarily from ceramic parts. Since the CTEs generally match between the ceramic backing element 54 and the piezoelectric element 50, these two parts may generally expand and contract with temperature variations at approximately the same rate. This may be particularly helpful when the ultrasonic transducer 12 is being exposed to a wide range of temperature conditions, such as those experienced in downhole applications. As the backing and piezoelectric elements 54 and 50 generally expand and contract together, the bonding layer 64 may not degrade at elevated temperatures as it might otherwise when used to bond materials of differing CTEs. Thus, the ceramic material used for the backing element 54 may help to maintain the integrity of the bonding layer 64 in the ultrasonic transducer 12.

Figure 4:
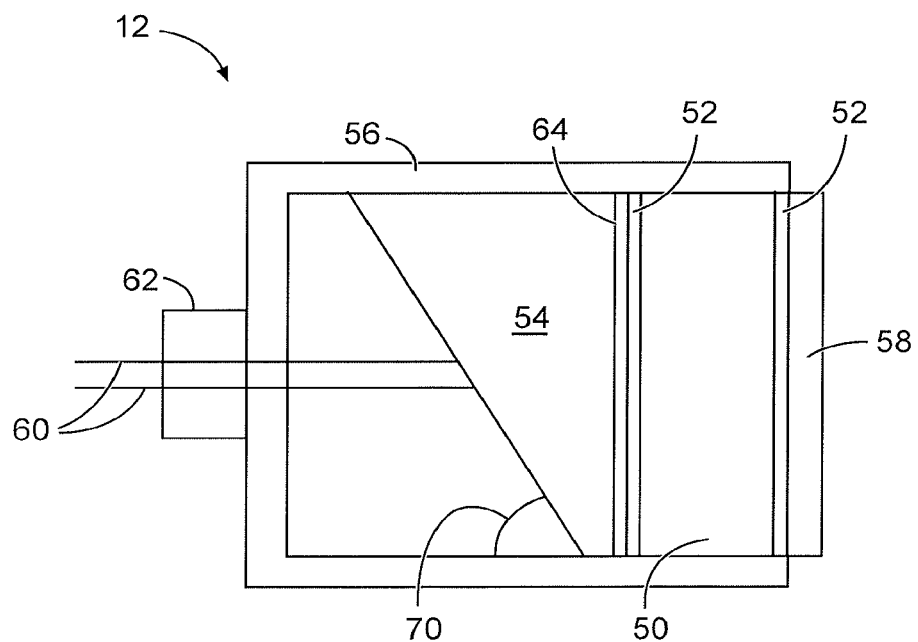
FIG. 4 is a schematic illustration of an ultrasonic transducer with a ceramic backing material having an angled back end, in accordance with an embodiment of the present disclosure.

It should be noted that the use of a ceramic backing material as the backing element 54 may enable the backing element 54 to be machinable. FIG. 4 illustrates an embodiment of the ultrasonic transducer 12 where the ceramic backing element 54 has been machined at an angle 70 along the back side of the backing element 54. Existing tungsten-rubber backing elements are generally not machinable after they are initially poured into a desired shape. The ceramic material used in the presently disclosed backing element 54, however, may be machined to precision at any point in the process, and in a variety of desired configurations depending on the desired effect of the shaping.

Such shaping and machining of the ceramic backing element 54 may be used to reduce the reflection and scattering of acoustic waves that might otherwise occur off the back wall of the backing element 54. Therefore, the shaping at the back end of the backing element 54 may provide another option (along with the backing material itself) for reducing reflections of acoustic waves off the back wall of the backing element 54 during transducer measurements. The machinability of the ceramic may also allow for the disclosed ceramic backing element 54 to be used in a focus transducer, such as those used in a medical ultrasonic array.

In addition, shaping and machining the ceramic backing element 54 may enable the transducer 12 to be built in more customized shapes. For example, the backing element 54 may be machined to a wedge shape to be used in a wedge-shaped transducer 12. Other shapes may be utilized in other embodiments as well, such as a transducer with a rounded back end. Such specifically shaped transducer assemblies may be particularly useful in assemblies where they are to be positioned at angles for performing pitch-catch operations, as described above.

Figure 5A:
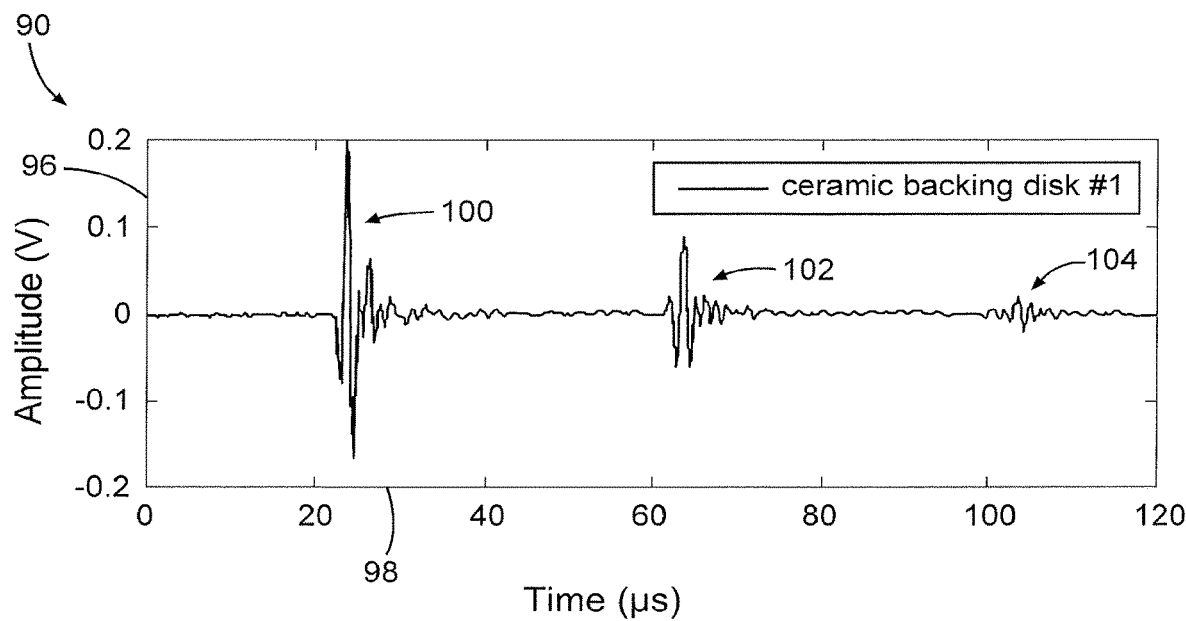
FIGS. 5A-5C are plots illustrating acoustic waves generated from an ultrasonic transducer featuring different ceramic backing materials, in accordance with an embodiment of the present disclosure.
Figure 5B:
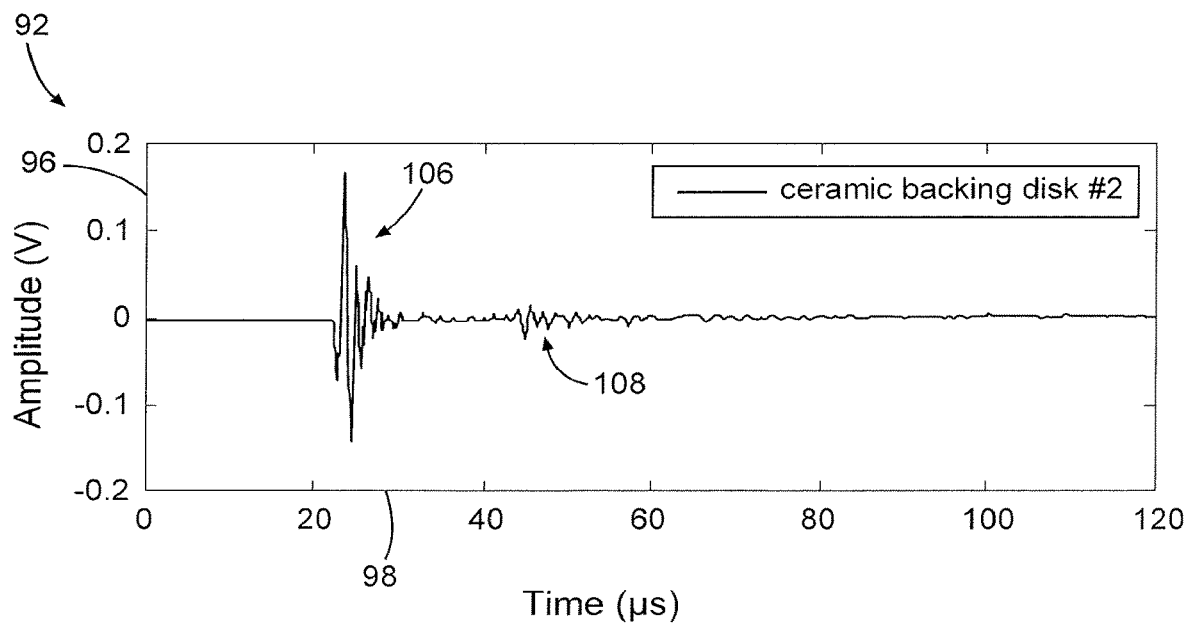
Figure 5C:
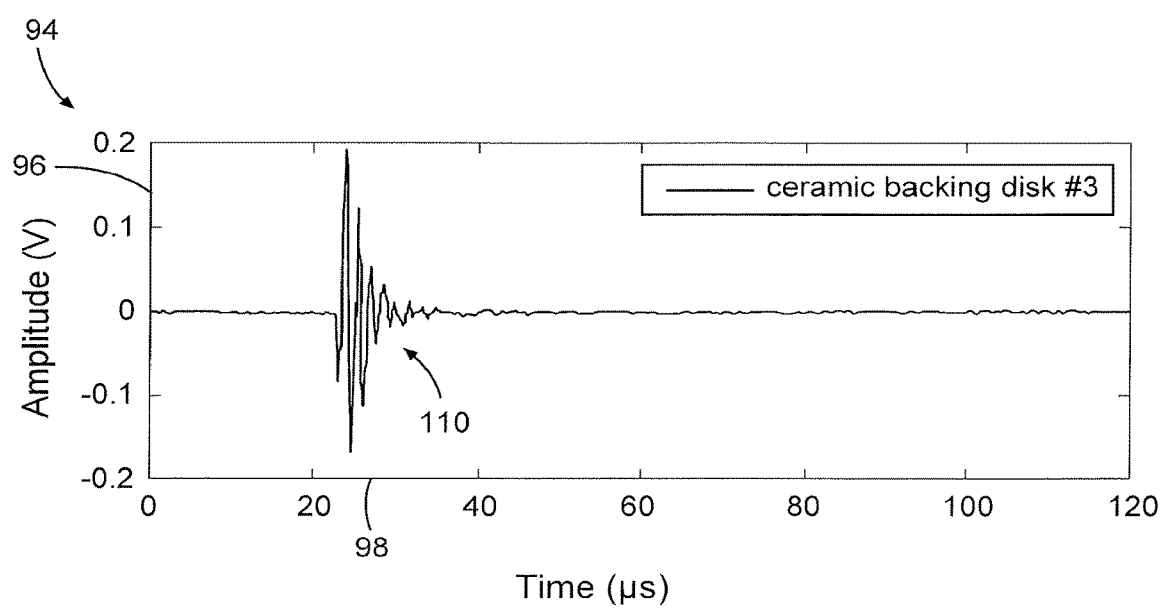

FIGS. 5A-5C include plots 90, 92, and 94 representing acoustic attenuation tests that have been performed on three different ceramic backing elements to demonstrate the effectiveness of the each backing. The plots 90, 92, and 94 show water tank measurement results taken using a hydrophone to collect the acoustic waves generated within each ceramic backing element. For each test, a current was applied across a piezoelectric element so that the piezoelectric element would output an ultrasonic pulse with a center frequency of approximately 500 kHz. The piezoelectric element was generally bonded at one side to a thick disk of the particular ceramic backing material being tested. The plots 90, 92, and 94 illustrate the amplitude 96 of acoustic waves detected from the three different backing materials taken with respect to time 98. The ceramic backing element used in the first test (plot 90) may be approximately 2.0 inches thick, while the ceramic backing elements used in both the second test (plot 92) and the third test (plot 94) may each be approximately 1.2 inches thick. The three ceramic backing elements tested each featured a different ceramic material composition.

In the first plot 90, the trendline shows a first peak 100 at the direct arrival of the ultrasonic pulse from the piezoelectric element to the backing element. The plot 90 shows additional peaks 102 and 104 that occur after the first peak 100. These additional peaks represent echoes of the original pulse that are reflected from a rear surface of the backing element. The presence of these echoes, as shown in the plot 90, may indicate insufficient attenuation by the backing material. As shown, the first ceramic material tested (results shown in plot 90) features two reflected peaks 102 and 104, implying insufficient attenuation despite this ceramic backing element being thicker than those of plots 92 and 94. The second ceramic material tested (results shown in plot 92) features an initial peak 106 and one small reflected peak 108. The third ceramic material tested (plot 94) only features an initial peak 110 with no reflected peaks. Therefore, the third ceramic backing material from the plot 94 shows the best overall performance of the three ceramic materials that were tested.

The disclosed ceramic backing element may be temperature stable and able to provide consistent acoustic attenuation performance in borehole and drilling environments. This kind of consistent performance is generally not available through currently used tungsten-rubber backing elements, which tend to degrade at high temperatures and pressures. In addition, the ceramic backing element may be relatively easy to produce, particularly in large quantities (e.g., mass production), since it does not involve complicated manufacturing processes. Therefore, an ease and low cost of assembly of the resulting ultrasonic transducer may be realized using the disclosed ceramic backing elements. In addition, the machinability of the ceramics may enable them to be easily adapted to focus transducers and other systems, such as ultrasonic arrays used in the medical field.

Embodiments disclosed herein include:

A. A system including an ultrasonic transducer for use in a borehole environment. The ultrasonic transducer includes a piezoelectric element, a pair of electrodes disposed one on each side of the piezoelectric element to enable a current flow through the piezoelectric element, and a backing element disposed on one side of the piezoelectric element to attenuate vibrations in the ultrasonic transducer from the piezoelectric element, wherein the backing element is a ceramic backing material.

B. A system including a borehole tool designed for use in a borehole, the borehole tool including at least one ultrasonic transducer. The ultrasonic transducer includes a piezoelectric element, a pair of electrodes disposed one on each side of the piezoelectric element to enable a current flow through the piezoelectric element, and a backing element disposed on one side of the piezoelectric element to attenuate vibrations in the ultrasonic transducer from the piezoelectric element, wherein the backing element is a ceramic backing material.

C. A method including outputting an acoustic signal in a borehole environment via a piezoelectric element of an ultrasonic transducer. The method also includes attenuating waves formed by the acoustic signal from the piezoelectric element, via a backing element disposed in the ultrasonic transducer, wherein the backing element is a ceramic backing material.

Each of the embodiments A, B, and C may have one or more of the following additional elements in combination: Element 1: wherein the ceramic backing material has a mechanical Q factor of less than approximately 10. Element 2: wherein a mechanical impedance of the ceramic backing material is approximately the same as a mechanical impedance of the piezoelectric element. Element 3: wherein the ultrasonic transducer further includes a bonding material disposed between the ceramic backing material and the piezoelectric element to bond the ceramic backing material to the piezoelectric element, wherein the bonding material includes an epoxy with ceramic powder or metal powder disposed therein. Element 4: wherein the backing element includes a back end facing away from the piezoelectric element, wherein the back end is angled to reduce acoustic reflections through the backing element. Element 5: wherein the backing element includes an angled back end facing away from the piezoelectric element to form a wedge-shaped ultrasonic transducer. Element 6: wherein the piezoelectric element is diced. Element 7: wherein the backing element is mechanically stable at temperatures up to approximately 320° Celsius. Element 8: wherein a coefficient of thermal expansion of the ceramic backing material is approximately equal to a coefficient of thermal expansion of the piezoelectric element.

Element 9: wherein the borehole tool includes a drill string comprising a plurality of ultrasonic transducers disposed circumferentially around the drill string to determine a distance from a drill cutter to a wall of the borehole, wherein each of the plurality of ultrasonic transducers include a backing element that is a ceramic backing material. Element 10: wherein the borehole tool includes a wireline tool comprising the at least one ultrasonic transducer to measure corrosion of a casing disposed in the borehole, to detect a quality of a cement bond within the borehole, to map a shape of the borehole, or a combination thereof. Element 11: wherein the borehole tool includes at least two ultrasonic transducers positioned to perform pitch-catch measurements within the borehole, wherein the at least two ultrasonic transducers each include a backing element that is a ceramic backing material. Element 12: wherein the backing element is machined to feature a sloping back end facing away from the piezoelectric element.

Element 13: further including maintaining a bonding layer of epoxy between the piezoelectric element and the backing element during temperature changes as the backing element expands and contracts according to approximately the same coefficient of thermal expansion as the piezoelectric element. Element 14: further including reducing reflections from the back end of the backing element via a machined surface of the backing element facing away from the piezoelectric element. Element 15: further including performing pitch-catch operations in the borehole environment via the ultrasonic transducer. Element 16: further including supporting the ultrasonic transducer in the borehole environment via a drill string, and performing measurements of distance between a borehole wall and a drill cutter via the ultrasonic transducer. Element 17: further including supporting the ultrasonic transducer in the borehole environment via a wireline, and performing measurements of casing corrosion, cement bond quality, borehole shape, or a combination thereof, via the ultrasonic transducer.

Although the present disclosure and its advantages have been described in detail, it should be understood that various changes, substitutions and alterations can be made herein without departing from the spirit and scope of the disclosure as defined by the claims.

What is claimed is:

1. A system, comprising:
   an ultrasonic transducer for use in a borehole environment, comprising:
   a piezoelectric element;
   a pair of electrodes disposed one on each side of the piezoelectric element to enable a current flow through the piezoelectric element; and
   a backing element disposed on one side of the piezoelectric element to attenuate vibrations in the ultrasonic transducer from the piezoelectric element, wherein the backing element is a ceramic backing material, wherein the backing element is configured to eliminate acoustic reflections from the attenuated vibrations.

2. The system of claim 1, wherein the ceramic backing material has a mechanical Q factor of less than 10.

3. The system of claim 1, wherein the ultrasonic transducer further comprises a bonding material disposed between the ceramic backing material and the piezoelectric element to bond the ceramic backing material to the piezoelectric element, wherein the bonding material comprises an epoxy with ceramic powder or metal powder disposed therein.

4. The system of claim 1, wherein the backing element comprises a back end facing away from the piezoelectric element, wherein the back end is angled to reduce acoustic reflections through the backing element.

5. The system of claim 1, wherein the backing element comprises an angled back end facing away from the piezoelectric element to form a wedge-shaped ultrasonic transducer.

6. The system of claim 1, wherein the piezoelectric element is diced.

7. The system of claim 1, wherein the backing element is mechanically stable at temperatures up to 320° Celsius.

8. A system, comprising:
   a borehole tool designed for use in a borehole, the borehole tool comprising at least one ultrasonic transducer, wherein the at least one ultrasonic transducer comprises:
   a piezoelectric element;
   a pair of electrodes disposed one on each side of the piezoelectric element to enable a current flow through the piezoelectric element; and
   a backing element disposed on one side of the piezoelectric element to attenuate vibrations in the ultrasonic transducer from the piezoelectric element, wherein the backing element is a ceramic backing material, wherein the backing element is configured to eliminate acoustic reflections from the attenuated vibrations.

9. The system of claim 8, wherein the borehole tool comprises a drill string comprising a plurality of ultrasonic transducers disposed circumferentially around the drill string to determine a distance from a drill cutter to a wall of the borehole, wherein each of the plurality of ultrasonic transducers comprise a backing element that is a ceramic backing material.

10. The system of claim 8, wherein the borehole tool comprises a wireline tool comprising the at least one ultrasonic transducer to measure corrosion of a casing disposed in the borehole, to detect a quality of a cement bond within the borehole, to map a shape of the borehole, or a combination thereof.

11. The system of claim 8, wherein the borehole tool comprises at least two ultrasonic transducers positioned to perform pitch-catch measurements within the borehole, wherein the at least two ultrasonic transducers each comprise a backing element that is a ceramic backing material.

12. The system of claim 8, wherein the backing element is machined to feature a sloping back end facing away from the piezoelectric element.

13. A method, comprising:
    outputting an acoustic signal in a borehole environment via a piezoelectric element of an ultrasonic transducer; and
    attenuating vibration waves formed by the acoustic signal from the piezoelectric element, via a backing element disposed in the ultrasonic transducer, wherein the backing element is a ceramic backing material, wherein the backing element is configured to eliminate acoustic reflections from the attenuated vibration waves.

14. The method of claim 13, further comprising reducing reflections from the back end of the backing element via a machined surface of the backing element facing away from the piezoelectric element.

15. The method of claim 13, further comprising performing pitch-catch operations in the borehole environment via the ultrasonic transducer.

16. The method of claim 13, further comprising:
    supporting the ultrasonic transducer in the borehole environment via a drill string; and
    performing measurements of distance between a borehole wall and a drill cutter via the ultrasonic transducer.

17. The method of claim 13, further comprising:
    supporting the ultrasonic transducer in the borehole environment via a wireline; and
    performing measurements of casing corrosion, cement bond quality, borehole shape, or a combination thereof, via the ultrasonic transducer.

* * * * *